(12) United States Patent
Hahn

(10) Patent No.: US 6,840,342 B1
(45) Date of Patent: Jan. 11, 2005

(54) SENSOR DEVICE FOR A MOTOR VEHICLE USED FOR DETECTING ENVIRONMENTAL PARAMETERS

(75) Inventor: Wolfgang Hahn, Schwabhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/070,567

(22) PCT Filed: Sep. 20, 2000

(86) PCT No.: PCT/EP00/09183

§ 371 (c)(1),
(2), (4) Date: Mar. 8, 2002

(87) PCT Pub. No.: WO01/21438

PCT Pub. Date: Mar. 29, 2001

(30) Foreign Application Priority Data

Sep. 23, 1999 (DE) .......................... 199 45 588

(51) Int. Cl.[7] .............................................. B60T 7/16
(52) U.S. Cl. ....................................................... 180/169
(58) Field of Search .................. 180/167, 169; 280/735; 701/300, 301, 302; 348/148; 307/10.1; 340/901, 903

(56) References Cited

U.S. PATENT DOCUMENTS

| | | | |
|---|---|---|---|
| 5,001,558 A | | 3/1991 | Burley et al. |
| 5,051,906 A | * | 9/1991 | Evans, Jr. et al. ...... 180/169 X |
| 5,686,889 A | * | 11/1997 | Hillis |
| 5,742,335 A | * | 4/1998 | Cannon |
| 5,952,957 A | * | 9/1999 | Szu |
| 6,028,672 A | * | 2/2000 | Geng |
| 6,341,016 B1 | * | 1/2002 | Malione |
| 6,344,893 B1 | * | 2/2002 | Mendlovic et al. |
| 6,483,429 B1 | * | 11/2002 | Yasui et al. |
| 6,753,766 B2 | * | 6/2004 | Patchell ...................... 340/436 |
| 2004/0051634 A1 | * | 3/2004 | Schofield et al. ........... 340/461 |

FOREIGN PATENT DOCUMENTS

| | | | |
|---|---|---|---|
| EP | 0 454 516 | | 10/1991 |
| EP | 736414 | * | 10/1996 |
| FR | 2 687 000 | | 8/1993 |
| JP | 4-164281 | * | 6/1992 |
| JP | 4-164282 | * | 6/1992 |
| JP | 9-96528 | * | 4/1997 |
| JP | 9/259390 | * | 10/1997 |
| JP | 10-162287 | | 6/1998 |
| JP | 10-255019 | | 9/1998 |
| JP | 2000-184368 | | 6/2000 |
| JP | 2002-255629 | * | 8/2002 |

OTHER PUBLICATIONS

Kodak Reference Handbook, pp. 8 and 9—dated Nov. 13, 1945.*
Printout from Internet Web Site www.sci.uop.edu—dated Apr. 2003.*
Printout from Internet Web Site www.csgnetwork.com—dated Mar. 2000.*
Printout from Internet Web Site www.archive.org showing dates of Internet Web Site www.canon–europa.com.*
Printout from Internet Web Site www.canon–europa.com—dated Apr. 2003, but containing info from May 1998.*

* cited by examiner

*Primary Examiner*—Bryan Fischmann
(74) *Attorney, Agent, or Firm*—Crowell & Moring LLP

(57) ABSTRACT

The invention relates to a sensor device for a motor vehicle used for detecting environmental parameters. The sensor has at least one camera system. At least two camera systems are used, each operating in a different region of the electromagnetic spectrum in order to improve the functionality of such a sensor device.

22 Claims, 1 Drawing Sheet

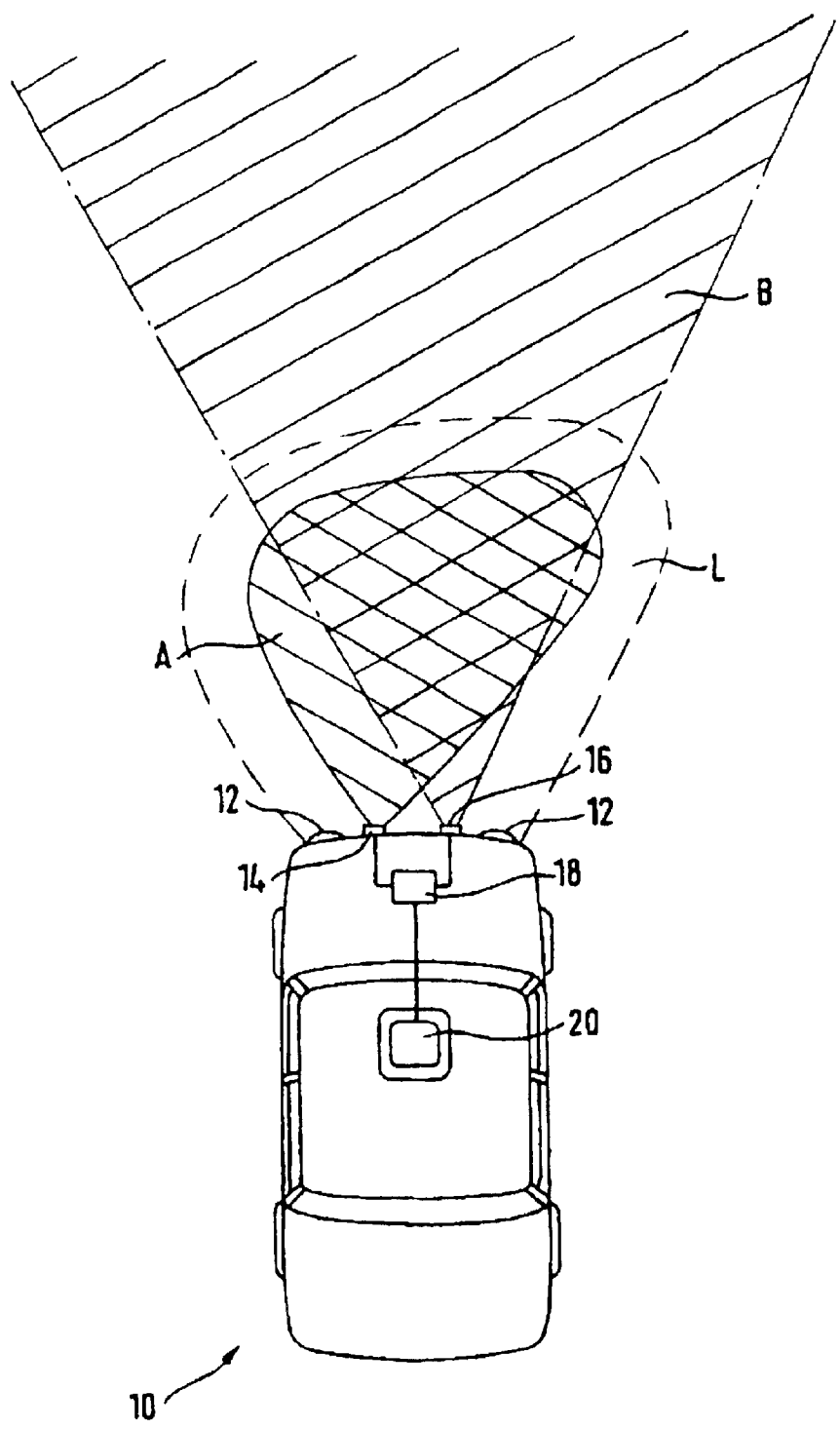

SENSOR DEVICE FOR A MOTOR VEHICLE USED FOR DETECTING ENVIRONMENTAL PARAMETERS

BACKGROUND AND SUMMARY OF THE INVENTION

The invention relates to a sensor arrangement for a motor vehicle for detecting an environment having at least two camera systems.

A sensor system of this type can be used, for example, for assisting the driver, thus for supporting an operator of a vehicle. It supplies information on the environment and can be used in the domain of lane tracking, for a warning in the case of a lane deviation, or in the domain of automatic vehicle guidance.

In the case of such sensor systems, it is known to use so-called CCD cameras (CCD=charged coupled device). However, it should be taken into account that the functionality of driving assistance systems is limited when the sensor is already subjected to limitations when detecting the environment. In the case of CCD cameras, it is known that, especially in darkness and in the event of blinding due to an external light source, these cameras have a limited functionality. In this case, with respect to a blinding light in darkness, a superproportional limitation should be taken into account, specifically when the CCD camera is adjusted to the environmentally caused illumination level. In the event another vehicle driving with switched-on lights is encountered, the image information is even largely destroyed by the oncoming blinding light sources.

The use of infrared cameras in such sensor arrangements is also known (see. e.g. technical journal: CAR AND DRIVER, October 1998). Infrared cameras obtain a heat image of the driving environment. In the heat image, all contours and objects are based on thermal contrasts. However, the information which is important for the driving task or for the reaction of a driver assistance system cannot always be obtained from the heat image.

European patent document EP 0 454 516 A1 describes an obstacle detection system having two video cameras, which generate images in the visible and in the infrared range. For generating images in the infrared range, CCD technology is used, for example. By means of a similar video camera, which can detect the entire spectrum, a differential signal is generated. This differential signal or differential image relates to the visual range, which is covered by the cameras and is based on the contrast of an object in this visual range. Japanese patent document JP-10 255019 also describes a system with a CCD camera, which generates a visible image from the area in front of a vehicle. Furthermore, an infrared image is generated by an additional infrared camera. Based on the temperature information, a threshold for illuminated parts is generated, and an improved vehicle detection can take place on the basis of this threshold.

It is an object of the present invention to further develop a sensor arrangement of the above-mentioned type such that the environment can be detected essentially without any limitation of the functionality.

This object is achieved by a sensor arrangement for a motor vehicle for detecting the environment using at least two camera systems. Each camera system operates in a different spectral region. Each camera system is adjusted to obtain images in different distance ranges.

An essential idea of the invention is to use at least two camera systems with respectively different spectral operating regions.

In this case, the different camera systems are adjusted to different distance ranges. For example, an infrared camera takes over the environmental detection in the remote range because it is suitable for day and night use and is free from the effects of blinding. Freedom from blinding means, in this context, that the individual pixels are not overmodulated by the headlights of oncoming vehicles. The image information is therefore retained although the environment is completely dark. The close range is detected by the CCD camera. In particular, the CCD camera is adjusted such that it operates in a range which is illuminated by the front headlights when the vehicle headlights are switched on. Because of the higher illumination level, this measure reduces the susceptibility of the CCD camera to blinding effects.

According to a preferred embodiment, the sensor arrangement comprises a CCD-camera (charged coupled device) and a camera which operates in the infrared range. The infrared camera represents, for example, a meaningful supplementation of the sensor system (CCD), which is visual here, beyond its detection limits in the extended area in front of the driving environment.

When using camera systems adjusted to different distance ranges and with connected imaging scales, the driving environment, as a whole, can be detected better in both the close and remote ranges.

Another advantage of using two camera systems with different spectral operating regions consists of determining the atmospheric absorbance in the two spectral regions via differential contrast evaluation, a comparison of differences in contrast between objects and their environments. Because atmospheric absorbances have different effects on images formed by different camera systems adjusted to different distance ranges, by comparing differences in contrast observed by the different camera systems (which are indicative of the atmospheric absorbances), conclusions can be drawn with respect to the extent of fog or haze. Furthermore, in conjunction with a visual range model stored in a vehicle, a driver's visual range can be determined from the detected absorbances. This information, in turn, can be made available to the driver, or control parameters can be adjusted in the vehicle as a function of the determined driver's visual range.

These and other advantageous embodiments are defined in the subclaims.

BRIEF DESCRIPTION OF THE DRAWING

The single FIGURE will be explained in detail in the following and with reference to the single drawing. The FIGURE of the single drawing is a schematic top view of a vehicle with a sensor system according to the invention arranged on the front of the vehicle.

DETAILED DESCRIPTION OF THE DRAWING

A vehicle 10 has two headlights 12, which illuminate a certain light range L during operation.

Between the two front headlights 12, two cameras are arranged, specifically in this case, an infrared camera 16 and a CCD camera (CCD=charged coupled device) 14. Both cameras 16 and 14 are aligned in the driving direction. The CCD camera is constructed and adjusted such that it essentially detects the range A, which is illuminated when the front headlights are switched on and therefore corresponds to the range L.

In contrast, the infrared camera 16 detects the environment particularly in the remote range B.

Both cameras 16, 14 are connected with a control and analyzing device 18. The control and analyzing device 18 emits a signal to a display 20, which is arranged in the interior of the vehicle within the driver's viewing range. The display 20 informs the driver of the environmental situation in the detected ranges.

In addition, but not shown in the FIGURE, the control and analyzing device 18 can supply its information also to other units in the vehicle, for example, to systems concerned with automatic vehicle guidance.

On the one hand, the control and analyzing device 18 forwards the information transmitted by the cameras 16 and 14 directly to the driver. It also carries out a differential contrast evaluation. As a result, the atmospheric absorbance can be determined in the two spectral regions. If a visual range model is also stored in the control and analyzing device 18, by way of the detected absorbances and by means of a differential contrast evaluation, a conclusion can also be drawn with respect to the driver's visual range.

This visual range and/or these detected absorbances can then be utilized for adapting control parameters or for recommending a vehicle speed to the driver.

However, for determining the atmospheric absorbance in the visible spectral region, another system, such as a light detection and ranging (LIDAR) system may also be used.

A memory device 22 can be provided in which a visual range model is stored. A device 24 is provided by which a conclusion can be drawn with respect to the visual range from information of the analyzing device 18.

What is claimed is:

1. A motor vehicle sensor system for detecting an outer environment, the sensor system comprising:
   at least two camera systems operable to image the outer environment; and
   wherein each camera system operates in a different spectral region and is adjusted to a different distance range.

2. The sensor system according to claim 1, wherein one of said at least two camera systems is an infrared camera operating in an infrared range.

3. The sensor system according to claim 2, wherein another of said at least two camera systems is a CCD camera.

4. The sensor system according to claim 3, wherein the CCD camera distance range is for detection within a close range.

5. The sensor system according to claim 4, wherein the close range substantially corresponds with a headlight cone range of a vehicle driven with its headlights on.

6. The sensor system according to claim 1, wherein one of said at least two camera systems is a CCD camera.

7. The sensor system according to claim 6, wherein the CCD camera distance range is for detection within a close range.

8. The sensor system according to claim 7, wherein the close range substantially corresponds with a headlight cone range of a vehicle driven with its headlights on.

9. The sensor system according to claim 1, further comprising an analyzing device operatively coupled with said at least two camera systems and receiving inputs therefrom.

10. The sensor system according to claim 9, wherein said analyzing device includes means for performing differential contrast evaluation.

11. The sensor system according to claim 10, further comprising:
    a memory device in which is stored a visual range model; and
    a visual range determining device operatively coupled to the memory device, said visual range determining device operating to draw a conclusion with respect to a visual range from information from the analyzing device.

12. The sensor system according to claim 11, wherein said information from the analyzing device is differential contrast evaluation information.

13. The sensor system according to claim 9, further comprising:
    a memory device in which is stored a visual range model; and
    a visual range determining device operatively coupled to the memory device, said visual range determining device operating to draw a conclusion with respect to a visual range from information from the analyzing device.

14. The sensor system according to claim 13, wherein said information from the analyzing device is differential contrast evaluation information.

15. A motor vehicle, comprising:
    a vehicle body;
    at least two camera systems arranged in a forward portion of the vehicle body for imaging areas in a traveling direction of the motor vehicle;
    wherein each of said at least two camera systems has a different spectral operating region; and
    further wherein each of said at least two camera systems is adjusted to a different distance range in the traveling direction.

16. The motor vehicle according to claim 15, wherein one of said at least two camera systems is an infrared camera operating in an infrared spectral region.

17. The motor vehicle according to claim 16, wherein another of said at least two camera systems is a CCD camera.

18. The motor vehicle according to claim 17, wherein said CCD camera distance range corresponds with a headlight cone range of a headlight arranged in the forward area of the vehicle.

19. The motor vehicle according to claim 15, wherein one of said at least two camera systems is a CCD camera.

20. The motor vehicle according to claim 19, wherein said CCD camera distance range corresponds with a headlight cone range of a headlight arranged in the forward area of the vehicle.

21. The motor vehicle according to claim 15, further comprising an analyzing device operatively coupled to said at least two camera systems, said analyzing device outputting a display signal.

22. The motor vehicle according to claim 21, further comprising a display arranged in an interior of the vehicle within a driver's viewing range, said display receiving the display signal from the analyzing device to provide environmental situation information to the driver.

* * * * *